US010843669B2

(12) United States Patent
Leach et al.

(10) Patent No.: US 10,843,669 B2
(45) Date of Patent: Nov. 24, 2020

(54) SENSOR CONTROL SYSTEM FOR AUTONOMOUS VEHICLE

(71) Applicant: UATC, LLC, San Francisco, CA (US)

(72) Inventors: William M. Leach, West Bloomfield, MI (US); Scott C. Poeppel, Pittsburgh, PA (US); Matthew A. Langford, Pittsburgh, PA (US); Tess H. Bianchi, Ponce Inlet, FL (US)

(73) Assignee: UATC, LLC, San Francisco, CA (US)

( * ) Notice: Subject to any disclaimer, the term of this patent is extended or adjusted under 35 U.S.C. 154(b) by 77 days.

(21) Appl. No.: 15/797,365

(22) Filed: Oct. 30, 2017

(65) Prior Publication Data

US 2019/0092287 A1 Mar. 28, 2019

Related U.S. Application Data

(60) Provisional application No. 62/564,322, filed on Sep. 28, 2017.

(51) Int. Cl.
*B60S 1/60* (2006.01)
*G01D 21/02* (2006.01)
*B60S 1/56* (2006.01)
*B60S 1/48* (2006.01)
*B60S 1/54* (2006.01)

(52) U.S. Cl.
CPC ............ *B60S 1/603* (2013.01); *B60S 1/56* (2013.01); *G01D 21/02* (2013.01); *B60S 1/481* (2013.01); *B60S 1/54* (2013.01); *B60S 1/566* (2013.01)

(58) Field of Classification Search
CPC .. B60S 1/603; B60S 1/56; B60S 1/481; B60S 1/54; B60S 1/566; G01D 21/02
See application file for complete search history.

(56) References Cited

U.S. PATENT DOCUMENTS 7,102,496 B1 * 9/2006 Ernst, Jr. .......... G08G 1/096725
180/167
7,103,460 B1 9/2006 Breed
(Continued)

FOREIGN PATENT DOCUMENTS

EP 2884364 6/2015
WO WO2016/187759 12/2016

OTHER PUBLICATIONS

PCT International Search Report and Written Opinion for PCT/US2018/050563, dated Dec. 20, 2018, 13 pages.

*Primary Examiner* — Regis J Betsch
(74) *Attorney, Agent, or Firm* — Dority & Manning, P.A.

(57) ABSTRACT

The present disclosure provides systems and methods for controlling a sensor system. More particularly, a sensor control system can access respective first data and second data descriptive of one or more monitored parameters associated with a first sensor of an autonomous vehicle. Based on the first data and the second data, the sensor control system can determine that a change in the one or more monitored parameters between the first sensor and the one or more second sensors has exceeded a predetermined threshold level. In response, the sensor control system can implement a control action relative to at least the first sensor (e.g., initiating cleaning of the first sensor, adjusting alignment of the first sensor, determining a compensation factor for the first data received from the first sensor, or communicating a signal request for service of the first sensor).

16 Claims, 7 Drawing Sheets

(56) References Cited

U.S. PATENT DOCUMENTS

| | | | |
|---|---|---|---|
| 7,124,027 B1* | 10/2006 | Ernst, Jr. | G01S 13/931 |
| | | | 701/301 |
| 9,274,525 B1 | 3/2016 | Ferguson et al. | |
| 9,535,423 B1* | 1/2017 | Debreczeni | G05D 1/0246 |
| 2005/0005463 A1* | 1/2005 | O'Mahony | G01B 11/002 |
| | | | 33/286 |
| 2013/0291637 A1 | 11/2013 | Dorner et al. | |
| 2015/0090291 A1* | 4/2015 | Na | B60S 1/56 |
| | | | 134/6 |
| 2015/0138357 A1* | 5/2015 | Romack | B60S 1/522 |
| | | | 348/148 |
| 2015/0329088 A1* | 11/2015 | Krajisnik | B60R 1/00 |
| | | | 134/18 |
| 2016/0004144 A1* | 1/2016 | Laroia | G03B 17/18 |
| | | | 348/222.1 |
| 2018/0141521 A1* | 5/2018 | Irie | B60R 1/00 |
| 2018/0307238 A1* | 10/2018 | Wisniowski | G05D 1/0246 |

* cited by examiner

SENSOR CONTROL SYSTEM FOR AUTONOMOUS VEHICLE

PRIORITY CLAIM

The present application is based on and claims priority to U.S. Provisional Application 62/564,322 having a filing date of Sep. 28, 2017, which is incorporated by reference herein.

FIELD

The present disclosure relates generally to autonomous vehicles. More particularly, the present disclosure relates to systems and methods for controlling a sensor system including one or more sensors associated with an autonomous vehicle.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a sensor control system for an autonomous vehicle. The sensor control system includes a computing system comprising one or more processors and one or more non-transitory computer-readable media that collectively store instructions that, when executed by the one or more processors, cause the computing system to perform operations. The operations include accessing first data descriptive of one or more monitored parameters associated with a first sensor of an autonomous vehicle. The operations also include accessing second data descriptive of the one or more monitored parameters associated with one or more second sensors of the autonomous vehicle. The operations also include determining, based on the first data and the second data, that a change in the one or more monitored parameters between the first sensor and the one or more second sensors has exceeded a predetermined threshold level. The operations also include in response to determining that the change in the one or more monitored parameters between the first sensor and the one or more second sensors has exceeded the predetermined threshold level, implementing a control action on the first sensor.

Another example aspect of the present disclosure is directed to an autonomous vehicle, comprising a sensor system and a sensor control system. The sensor system includes a first sensor and one or more second sensors configured to obtain respective first sensor data and second sensor data descriptive of one or more monitored parameters associated with an autonomous vehicle. The sensor control system includes a sensor cleaning system configured to clean at least the first sensor. The sensor control system also includes a sensor alignment system configured to align at least the first sensor. The sensor control system also includes a computing system including one or more computing devices configured to access data descriptive of the first data and the second data, to determine based on the first data and the second data that a change in the one or more monitored parameters has occurred, and in response to determining that the change in the one or more monitored parameters has occurred to generate a control action signal to one or more of the sensor cleaning system and the sensor alignment system.

Another example aspect of the present disclosure is directed to a computer-implemented method for controlling a sensor system. The computer-implemented method includes accessing, by a computing system comprising one or more computing devices, first data descriptive of one or more monitored parameters associated with a first sensor of an autonomous vehicle. The computer-implemented method also includes accessing, by the computing system, second data descriptive of the one or more monitored parameters associated with one or more second sensors of an autonomous vehicle. The computer-implemented method also includes determining, by the computing system, based on the first data and the second data, that a change in the one or more monitored parameters between the first sensor and the one or more second sensors has exceeded a predetermined threshold level. The computer-implemented method also includes in response to determining that a change in the one or more monitored parameters between the first sensor and the one or more second sensors has exceeded the predetermined threshold, implementing, by the computing system, a control action relative to at least the first sensor, the control action comprising one or more of a initiating cleaning of at least the first sensor, adjusting alignment of at least the first sensor, determining a compensation factor for the first data received from the first sensor, and communicating a signal request for service of at least the first sensor.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
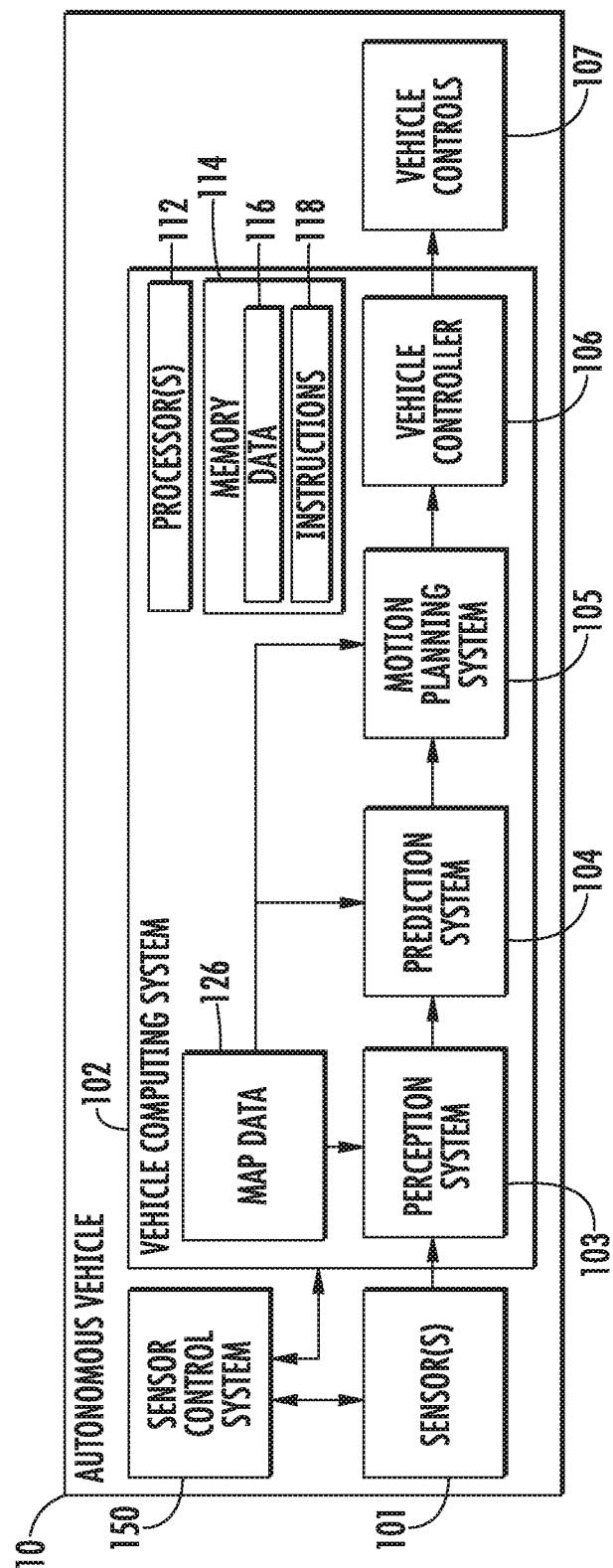
FIG. 1 depicts a block diagram of an example autonomous vehicle according to example embodiments of the present disclosure.

Generally, the present disclosure is directed to systems and methods for controlling a sensor system including one or more sensors associated with an autonomous vehicle. The one or more sensors can include one or more cameras, Light Detection and Ranging (LIDAR) system sensors, Radio Detection and Ranging (RADAR) system sensors, and/or other sensors. More particularly, the systems and methods of the present disclosure can control an AV sensor system based at least in part on first data descriptive of one or more monitored parameters associated with a first sensor of an autonomous vehicle and second data descriptive of the one or more monitored parameters associated with one or more second sensors of the autonomous vehicle. When the first data and second data indicate that a change in the one or more monitored parameters has exceeded a predetermined threshold level, a control action can be implemented on the first sensor. For example, a computing device can initiate cleaning of the first sensor, adjust alignment of the first sensor, determine an algorithmic compensation for sensor output data, and/or signal for sensor service. Sensor parameter monitoring and implementation of control actions when needed can help ensure sensor quality and precision for navigation and other applications within an autonomous vehicle.

According to an example aspect of the present disclosure, in some implementations, a sensor control system can include a computing system, which can include one or more computing devices. The computing system can more particularly include one or more processors and one or more non-transitory computer-readable media that collectively store instructions that, when executed by the one or more processors, cause the computing system to perform operations. In some implementations, the computing system can access data descriptive of one or more monitored parameters associated with sensor data observed by one or more sensors provided within an autonomous vehicle. More particularly, the computing system can access first data descriptive of one or more monitored parameters associated with a first sensor of an autonomous vehicle. The computing system can also access second data descriptive of the one or more monitored parameters associated with one or more second sensors of the autonomous vehicle. The computing system can determine that a change in the one or more monitored parameters has exceeded a predetermined threshold level.

In some implementations, the one or more monitored parameters associated with observed first data and second data can include one or more locations of one or more reference objects that are within a field of view of the first sensor and the one or more second sensors. In some implementations, the one or more reference objects can include one or more fixed features within the field of view of the first sensor and one or more second sensors. For example, one or more fixed features can include part of the physical structure of the autonomous vehicle, one or more objects within the environment of the autonomous vehicle, or other reference objects. For example, the one or more fixed features can include one or more side-view mirrors of the autonomous vehicle, one or more door handles of the autonomous vehicle, one or more wheels of the autonomous vehicle, one or more bumper corners of the autonomous vehicle, one or more roof corners of the autonomous vehicle, one or more visual targets painted on or otherwise positioned relative to the autonomous vehicle, and/or other suitable features. Determining that a change in one or more monitored parameters between the first sensor and the one or more second sensors has exceeded a predetermined threshold level can more particularly correspond to determining that a change in the relative location of each reference object over time has exceeded a predetermined threshold distance.

More particularly, in some implementations, an initial location can be determined for each of the one or more reference objects to provide a reference point for the disclosed monitoring algorithms. The initial location for each of the one or more reference objects can be determined from the first data including information that describes the location of objects within the surrounding environment of the autonomous vehicle, for example, by determining the relative location of each reference object within a portion of the first data at an initial time. The location of such reference object can be monitored to determine whether any substantial change in such parameter has occurred over time. This can be done by comparing the first data obtained by the first sensor at a first time to second data obtained by one or more second sensors at a second time, wherein the one or more second sensors comprises the first sensor. When a change in the current location of the one or more reference objects has been determined to exceed a predetermined threshold level (e.g., the current location determined from the second data is greater than a predetermined threshold distance from the initial location determined from the first data), then such change can be indicative of misalignment of the first sensor. This could happen, for example, if the first sensor is mounted on a side-view mirror which is inadvertently shifted to a different position. To ensure proper operation of the sensors, the computing system of the sensor control system could then implement a control action such as automatically adjusting alignment of the first sensor (e.g., adjusting the mirror position and/or first sensor position such that the first sensor can obtain sensor data in which the reference objects have returned to their initial location).

In other implementations, a change in the current location of the one or more reference objects can correspond to one or more of the reference objects appearing to be missing from the sensor data. More particularly, first data obtained from a first sensor at a first time can identify an initial location of a given reference object within such first data, while second data obtained from one or more second sensors (e.g., that include the first sensor) at a second time subsequent to the first time can identify that the given reference object is now missing. Such change could be indicative of contamination of the first sensor. This could happen, for example, if a splash from a mud puddle can have obscured a camera lens, thereby causing a reference object to disappear from the first data collected by the first sensor (e.g., the corresponding camera). To ensure proper operation of this camera, the computing system of the sensor control system could then implement a control action such as initiating cleaning of the first sensor (e.g., automated sensor cleaning for a camera).

More particularly, in some implementations, the one or more monitored parameters associated with observed sensor data can include a vehicle motion parameter estimate determined by each of the first sensor and the one or more second sensors during an observation of one or more features in a surrounding environment of the autonomous vehicle. For instance, a local motion parameter estimate can be determined by the first sensor during observation of one or more features in the surrounding environment. The local motion parameter estimate determined by the first sensor can be compared to an actual vehicle motion parameter determined by one or more second sensors. In some implementations, the first sensor that determines the local motion parameter estimate is a sensor used by an autonomous vehicle to detect and track objects within the surrounding environment on a continuous basis in order to determine an appropriate motion plan for the autonomous vehicle. The one or more second sensors that determine the actual motion parameter estimate can be a different sensor than the first sensor. For example, the one or more second sensors can include a motion sensor (e.g., an inertial measurement unit (IMU), a speedometer, an accelerometer) and/or a position sensor (e.g. a GPS system, a Galileo positioning system, the GLObal NAvigation Satellite System (GLONASS), the BeiDou Satellite Navigation and Positioning system). The one or more vehicle motion parameters associated with the autonomous vehicle can include a current vehicle location (also referred to as position); current vehicle speed (also referred to as velocity); current vehicle acceleration; current vehicle heading; current vehicle orientation, or other suitable parameter.

If the local motion parameter estimate determined from the first data and the actual vehicle motion parameter determined from the second data are substantially the same (e.g., if a difference between the actual vehicle motion parameter and the local motion parameter estimate is approximately equal to zero), then the first sensor obtaining the local motion parameter estimate can be considered to be properly aligned. If a difference between the actual vehicle motion parameter and the local motion parameter estimate is greater than a predetermined threshold value, then such difference can be indicative of misalignment of the first sensor. In response, the computing system of the sensor control system could then implement a control action such as automatically adjusting alignment of the first sensor.

In some implementations, the one or more monitored parameters associated with observed sensor data can include a quality level associated with the first sensor and the one or more second sensors (e.g., a camera, a LIDAR sensor, a RADAR sensor, etc.). In some implementations, the quality level can correspond to a contamination level of a sensor surface of the first sensor. More particularly, for example, the first sensor can correspond to a camera, and the one or more monitored parameters can include a sharpness and/or a brightness of at least a portion of a frame included in imagery captured by the camera. Imagery can be analyzed for image sharpness and/or brightness based on pixel to pixel contrast across at least a portion of a frame included in the imagery captured by the camera. Changes in sensor quality level, for example, at one or more pixels over time can be indicative of contamination of the one or more sensors. This could happen, for example, if a splash from a mud puddle can have obscured a camera lens, thereby causing the image quality to change at one or more pixels within imagery obtained by the corresponding camera. To ensure proper operation of this camera, the computing system of the sensor control system could then implement a control action such as automated sensor cleaning for the camera.

Control actions can vary depending on whether the change in monitored parameter indicates potential misalignment, contamination, or other occurrence. In some implementations, a computing system associated with a sensor control system can initiate cleaning of one or more sensors when a change in the monitored parameter(s) associated with the one or more sensors is indicative of potential contamination. In some implementations, a computing system associated with a sensor control system can automatically adjust alignment of the one or more sensors when a change in the monitored parameter(s) associated with the one or more sensors is indicative of potential misalignment. In some implementations, a computing system associated with a sensor control system can determine a compensation factor for sensor data received from the one or more sensors (e.g., an adjusted location of objects detected within sensor data, an adjusted motion parameter derived from sensor data, etc.) The compensation factor can be based at least in part on a level of the change in the one or more monitored parameters. In some implementations, a computing system associated with a sensor control system can communicate a signal request for service of the one or more sensors.

The disclosed sensor control systems and methods can be implemented with a variety of autonomous vehicle types. More particularly, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the autonomous vehicle can include a vehicle computing system that assists in controlling the autonomous vehicle. In particular, in some implementations, the vehicle computing system can receive sensor data from one or more sensors that are coupled to or otherwise included within the autonomous vehicle. As examples, the one or more sensors can include one or more LIDAR sensors, one or more RADAR sensors, one or more cameras (e.g., visible spectrum cameras, infrared cameras, etc.), and/or other sensors. The sensor data can include information that describes the location of objects within the surrounding environment of the autonomous vehicle.

In some implementations, the sensors can be located at various different locations on the autonomous vehicle. As an example, in some implementations, one or more cameras and/or LIDAR sensors can be located in a pod or other structure that is mounted on a roof of the autonomous vehicle while one or more RADAR sensors can be located in or behind the front and/or rear bumper(s) or body panel(s) of the autonomous vehicle. As another example, camera(s) can be located at the front or rear bumper(s) of the vehicle as well. Other locations can be used as well.

In some implementations, the autonomous vehicle can include a sensor cleaning system that cleans the one or more sensors of an autonomous vehicle, such as a fluid cleaning system (e.g., a gas or a liquid). For example, the sensor cleaning system can include a gas cleaning system that cleans the sensors using a gas (e.g., compressed air); a liquid cleaning system that cleans the sensors using a liquid (e.g., windshield washer fluid); or both a gas cleaning system and a liquid cleaning system. In some implementations, the sensor cleaning system can include one or more sensor wiper devices, such as a mechanical device comprising a wiper blade and an actuator configured to move the wiper blade across the sensor in order to clean the sensor.

In particular, in some implementations, the sensor cleaning system can include one or more sensor cleaning units that are configured to respectively clean one or more sensors of the autonomous vehicle. In some implementations, the sensor cleaning units can include gas-based cleaning units that use a gas to clean the sensors. For example, one or more of the gas cleaning units can be an air knife that uses a "knife" of air to clean the sensor. In some implementations, the sensor cleaning units can include liquid-based cleaning units that use a liquid to clean the sensors. For example, one or more of the liquid cleaning units can include a nozzle that sprays the liquid onto the sensor to clean the sensor. In some implementations, a sensor cleaning unit can be configured to clean a sensor using selectively the gas and the liquid. For example, the sensor cleaning unit can include two inflow lines respectively for the gas and the liquid and two different nozzles that respectively spray or otherwise release the gas the liquid. In some implementations, a sensor cleaning unit can be a sensor wiper device that moves a wiper blade over the surface of a sensor to clean the sensor.

In some implementations, the autonomous vehicle can include a sensor alignment system that adjusts alignment of the one or more sensors. For example, the sensor alignment system can include a rotational assembly coupled to each sensor within a sensor system. The rotational assembly can be configured to mechanically adjust the physical position of the one or more sensors in one or more dimensions (e.g., a first dimension corresponding to a lateral direction, a second dimension corresponding to a longitudinal direction, and/or a third dimension corresponding to a normal/vertical direction). The physical position of the one or more sensors can be adjusted directly or indirectly by adjusting the physical position of a component on which a sensor can be mounted (e.g., a side-view mirror). The sensor control system can be configured to generate a control action signal indicative of a desired alignment at which the rotational assembly can position the one or more sensors.

In some implementations, the sensor control system can include a sensor compensation system configured to determine a compensation factor for sensor data received from the one or more sensors. For example, when monitored parameters indicate a change in location of one or more reference objects, the sensor compensation system can determine an adjusted location of objects detected within sensor data. In another example, when monitored parameters indicate a change in the comparison of an estimated local motion parameter determined at least in part from object motion detected by a given sensor to an actual vehicle motion parameter, the sensor compensation system can determine an adjusted motion parameter. A compensation factor corresponding to one or more adjusted parameters can be particularly useful when a parameter change is indicative of misalignment of the one or more sensors. If alignment cannot be immediately or readily corrected, adjusting data currently obtained by a misaligned sensor can be a potentially temporary solution until alignment can be properly corrected by a service request or otherwise.

In some implementations, the sensor control system can include a sensor service signaling system that is configured to communicate a signal request for service of the one or more sensors. The signal request for service can be communicated, for example, from a computing system provided locally at the autonomous vehicle to a remote computing system (e.g., a remote computing system associated with a central operations system and/or an entity associated with the autonomous vehicle such as, for example, a vehicle owner, vehicle manager, fleet operator, service provider, etc.) In some implementations, for example, when a remote computing system is associated with a service provider, such entity can provide one or more vehicle service(s) to a plurality of users via a fleet of vehicles that includes, for example, the autonomous vehicle. The vehicle service(s) can include transportation services (e.g., rideshare services), courier services, delivery services, and/or other types of services. The vehicle service(s) can transport and/or deliver passengers as well as items such as but not limited to food, animals, freight, purchased goods, etc.

The systems and methods described herein may provide a number of technical effects and benefits. For example, sensor parameter monitoring and implementation of control actions when needed can help ensure sensor quality and precision for navigation and other applications within an autonomous vehicle. By providing an online detection system that can monitor when sensors appear to be misaligned and/or contaminated, control actions can be automatically implemented to remedy such occurrences. In the event that automated control actions are unsuccessful or difficult to implement (e.g., automated cleaning or alignment), additional control actions such as signaling a request for service or determining sensor compensation factors can be initiated. The disclosed sensor control systems and methods can thus help ensure that each sensor in a sensor system for autonomous vehicles continues to operate properly.

Improved performance of the one or more sensors can lead to improved performance of the autonomous vehicle motion control, which relies upon data collected by the one or more sensors to comprehend the surrounding environment of the autonomous vehicle. Thus, the improved and intelligent sensor control systems of the present disclosure can directly improve autonomous vehicle performance such as efficiency, safety, and passenger comfort. Further, example aspects of the present disclosure can provide for more efficient processing of data, by, for example, allowing for the use of a variety of data indicative of a change in monitored parameter(s) to be used to determine control actions implemented by the sensor control system.

Additional technical effects and benefits can be realized by accessing data descriptive of one or more monitored parameters associated with sensor data, whereby the same data can be used to determine sensor misalignment and/or contamination as is used to determine the location of objects within the surrounding environment of the autonomous vehicle. By observing changes in parameters that are monitored as part of sensor performance in object detection and tracking for autonomous vehicle navigation, separate sensor monitoring algorithms or interruption of sensor data gathering for object detection and tracking may not be required. As such, a more streamlined and efficient solution for monitoring and controlling sensors within an autonomous vehicle sensor system can be realized.

With reference now to the Figures, example embodiments of the present disclosure will be discussed in further detail.

FIG. 1 depicts a block diagram of an example autonomous vehicle 10 according to example embodiments of the present disclosure. The autonomous vehicle 10 is capable of sensing its environment and navigating with little to no human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, a sensor control system 150, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment.

The vehicle computing system 102 can control the one or more vehicle controls 107 to operate the autonomous vehicle 10 according to the motion path.

The vehicle computing system 102 includes one or more processors 112 and a memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the one or more processors 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a position sensor or positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 10 can be used by various systems of the vehicle computing system 102.

As another example, the one or more sensors 101 can include a motion sensor or motion sensing system. The motion sensor can be any device or circuitry for analyzing motion of the vehicle. For example, the motion sensor can determine one or more vehicle motion parameters by using an inertial measurement unit (IMU), a speedometer, an accelerometer and/or a position sensor (e.g. a GPS system, a Galileo positioning system, the GLObal NAvigation Satellite System (GLONASS), the BeiDou Satellite Navigation and Positioning system). The motion parameter(s) of the autonomous vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the autonomous vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

In particular, according to an aspect of the present disclosure, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

According to an aspect of the present disclosure, the autonomous vehicle 10 can further include the sensor control system 150. In particular, in some implementations, the sensor control system 150 can include a computing system, which can include one or more computing devices. The computing system provided as part of sensor control system 150 can be the vehicle computing system 102 or another computing system provided locally at or accessed remotely from autonomous vehicle 10. The sensor control system 150 can access data descriptive of one or more monitored parameters associated with sensor data observed by the one or more sensors 101 provided within autonomous vehicle 10. More particularly, the sensor control system 150 can access first data descriptive of one or more monitored parameters associated with a first sensor of the autonomous vehicle 10. The sensor control system 150 can also access second data descriptive of the one or more monitored parameters associated with one or more second sensors of the autonomous vehicle 10. The first sensor and the one or more second sensors can be the same or different sensors within the one or more sensors 101.

The sensor control system 150 can determine that a change in the one or more monitored parameters has exceeded a predetermined threshold level. In response to determining that a change in the one or more monitored parameters has exceeded a predetermined threshold level, the sensor control system 150 can generate a control action signal to one or more of a sensor cleaning system, a sensor alignment system, a sensor compensation system, and/or a sensor service signaling system. More particularly, the sensor control system 150 can generate a control action relative to at least the first sensor, the control action comprising one or more of a initiating cleaning of at least the first sensor, adjusting alignment of at least the first sensor, determining a compensation factor for the first data received from the first sensor, and communicating a signal request for service of at least the first sensor. More particular details of sensor control system 150 are presented with respect to FIG. 2.

Figure 2:
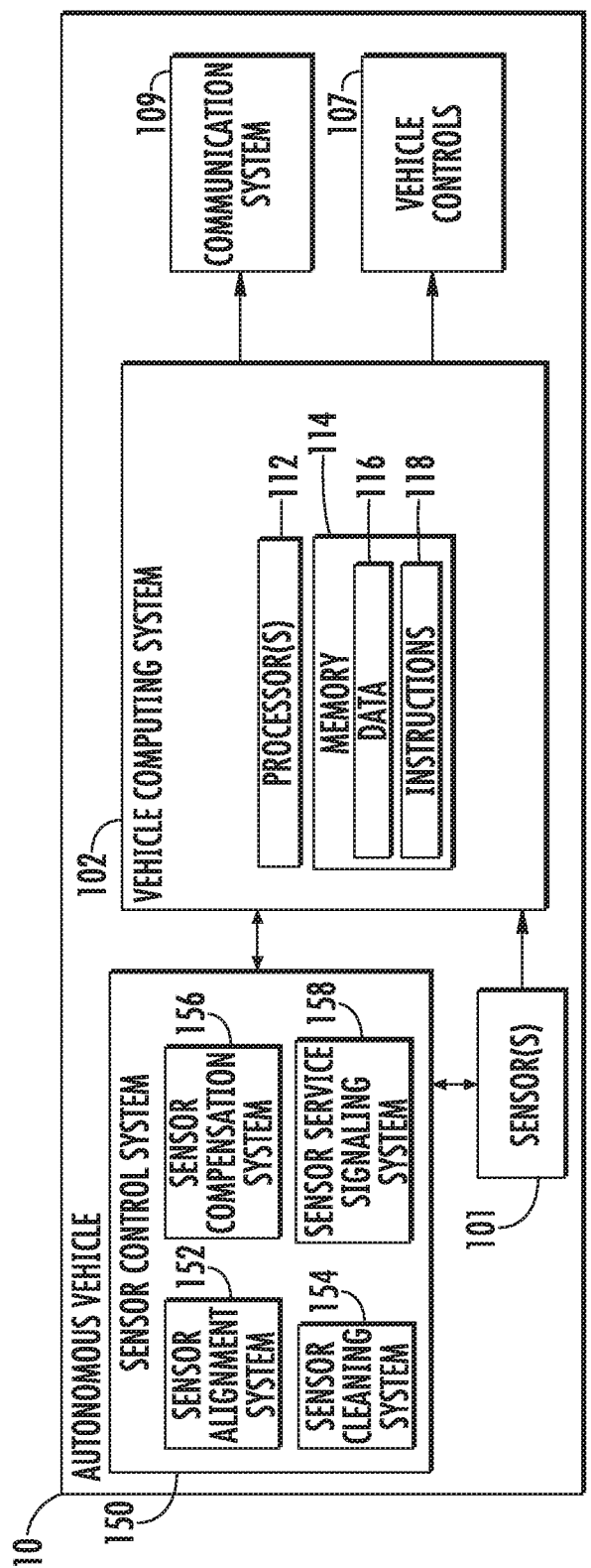
FIG. 2 depicts a block diagram of an example sensor control system according to example embodiments of the present disclosure.

FIG. 2 depicts a block diagram of an example autonomous vehicle 10 according to example embodiments of the present disclosure. Elements that are the same or similar to those of FIG. 1 are referred to with the same reference numerals. As shown, an autonomous vehicle 10 can include one or more sensors 101 and a sensor control system 150. The autonomous vehicle 10 can further include a vehicle computing system 102, which can be configured to receive data from the one or more sensors 101. Further, the vehicle computing system 102 can be configured to electronically communicate with the sensor control system 150 to implement one or more control actions (e.g., cleaning, aligning, etc.) relative to the one or more sensors 101.

FIG. 2 depicts a block diagram of an example sensor control system 150 according to example aspects of the present disclosure. In some implementations, the autonomous vehicle 10 can include a sensor alignment system 152 (e.g., as part of sensor control system 150) that can adjust alignment of the one or more sensors 101. For example, the sensor alignment system 152 can include a rotational assembly coupled to some or all sensors within a sensor system (e.g., the one or more sensors 101). The rotational assembly can be configured to mechanically adjust the physical position of the one or more sensors 101 in one or more dimensions (e.g., a first dimension corresponding to a lateral direction, a second dimension corresponding to a longitudinal direction, and/or a third dimension corresponding to a normal/vertical direction). The physical position of the one or more sensors 101 can be adjusted directly or indirectly by adjusting the physical position of a component on which a sensor can be mounted (e.g., a side-view mirror). The sensor control system 150 can be configured to generate a control action signal for sensor alignment system 152 that is indicative of a desired alignment at which the rotational assembly can position the one or more sensors 101.

Properly aligning one or more sensors via sensor alignment system 152 can advantageously improve the operation and performance of the one or more sensors 101. Improved performance of the one or more sensors 101 can lead to improved performance of motion control for autonomous vehicle 10, which relies upon data collected by the one or more sensors 101 to comprehend the surrounding environment of the autonomous vehicle 10. Thus, the improved and intelligent sensor control system 150 of the present disclosure can directly improve autonomous vehicle performance such as efficiency, safety, and passenger comfort.

In some implementations, the autonomous vehicle 10 can include a sensor cleaning system 154 (e.g., as part of sensor control system 150) that cleans the one or more sensors 101 of an autonomous vehicle 10, such as a fluid cleaning system (e.g., a gas or a liquid). For example, the sensor cleaning system 154 can include a gas cleaning system that cleans the sensor(s) 101 using a gas (e.g., compressed air); a liquid cleaning system that cleans the sensor(s) 101 using a liquid (e.g., windshield washer fluid); or both a gas cleaning system and a liquid cleaning system. In some implementations, the sensor cleaning system 154 can include one or more sensor wiper devices, such as a mechanical device comprising a wiper blade and an actuator configured to move the wiper blade across the sensor in order to clean the sensor(s) 101.

In particular, in some implementations, the sensor cleaning system 154 can include one or more sensor cleaning units that are configured to respectively clean one or more sensors 101 of the autonomous vehicle 10. In some implementations, the sensor cleaning units can include gas-based cleaning units that use a gas to clean the sensors. For example, one or more of the gas cleaning units can be an air knife that uses a "knife" of air to clean the sensor. In some implementations, the sensor cleaning units can include liquid-based cleaning units that use a liquid to clean the sensors. For example, one or more of the liquid cleaning units can include a nozzle that sprays the liquid onto the sensor to clean the sensor. In some implementations, a sensor cleaning unit can be configured to clean a sensor using selectively the gas and the liquid. For example, the sensor cleaning unit can include two inflow lines respectively for the gas and the liquid and two different nozzles that respectively spray or otherwise release the gas the liquid. In some implementations, a sensor cleaning unit can be a sensor wiper device that moves a wiper blade over the surface of a sensor to clean the sensor.

Cleaning of one or more sensors via sensor cleaning system 154 can advantageously improve the operation and performance of the one or more sensors 101. For example, in some operating conditions, sensors may experience accumulation of precipitation, dirt, dust, road salt, organic matter (e.g., "bug splatter," pollen, bird droppings, etc.), or other contaminants. The disclosed techniques can allow for prioritizing cleaning of sensors likely to or that actually have experienced increased accumulation of contaminants, thereby more efficiently using energy and gas resources and reducing "wear and tear" on the sensor cleaning units within sensor cleaning system 154. In addition, sensor cleaning system 154 can advantageously clean one or more sensors 101 upon determination that contamination of such sensor(s) has occurred, as opposed to waiting until a next periodically scheduled sensor cleaning or servicing of a sensor system.

In some implementations, the sensor control system 150 can include a sensor compensation system 156 configured to determine a compensation factor for sensor data received from the one or more sensors 101. For example, when monitored parameters indicate a change in location of one or more reference objects, the sensor compensation system 156 can determine an adjusted location of objects detected within sensor data from sensor(s) 101. In another example, when monitored parameters indicate a change in the comparison of an estimated local motion parameter determined at least in part from object motion detected by a given sensor to an actual vehicle motion parameter, the sensor compensation system 156 can determine an adjusted motion parameter. A compensation factor corresponding to one or more adjusted parameters can be particularly useful when a parameter change is indicative of misalignment of the one or more sensors. If alignment cannot be immediately or readily corrected, adjusting data currently obtained by a misaligned sensor can be a potentially temporary solution until alignment can be properly corrected by a service request or otherwise.

Compensating for one or more misaligned or contaminated sensors 101 via sensor compensation system 156 can advantageously improve the quality of data received from the one or more sensors 101. Improved performance of the one or more sensors 101 can lead to improved performance of motion control for autonomous vehicle 10, which relies upon data collected by the one or more sensors 101 to comprehend the surrounding environment of the autonomous vehicle 10. Thus, the improved and intelligent sensor control system 150 of the present disclosure can directly improve autonomous vehicle performance such as efficiency, safety, and passenger comfort.

In some implementations, the sensor control system 150 can include a sensor service signaling system 158 that is configured to communicate a signal request for service of the one or more sensors 101. The signal request for service can be communicated, for example, from a computing system provided locally at the autonomous vehicle (e.g., vehicle computing system 102) to a remote computing system (e.g., a remote computing system associated with a central operations system and/or an entity associated with the autonomous vehicle such as, for example, a vehicle owner, vehicle manager, fleet operator, service provider, etc.) For example, autonomous vehicle 10 can include a communication system 109 for transmitting signal requests for service initiated by sensor service signaling system 158 to one or more remote computing systems from autonomous vehicle 10. In some implementations, at least one of the one or more remote computing devices can be associated with a service provider that provides one or more vehicle service(s) to a plurality of users via a fleet of vehicles that includes, for example, the autonomous vehicle 10. The vehicle service(s) can include transportation services (e.g., rideshare services), courier services, delivery services, and/or other types of services. The vehicle service(s) can transport and/or deliver passengers as well as items such as but not limited to food, animals, freight, purchased goods, etc. The communication system 109 can include any suitable components for interfacing with one or more network(s), including, for example, transmitters, receivers, ports, controllers, antennas, and/or other suitable components that can help facilitate communication.

Figure 3A:
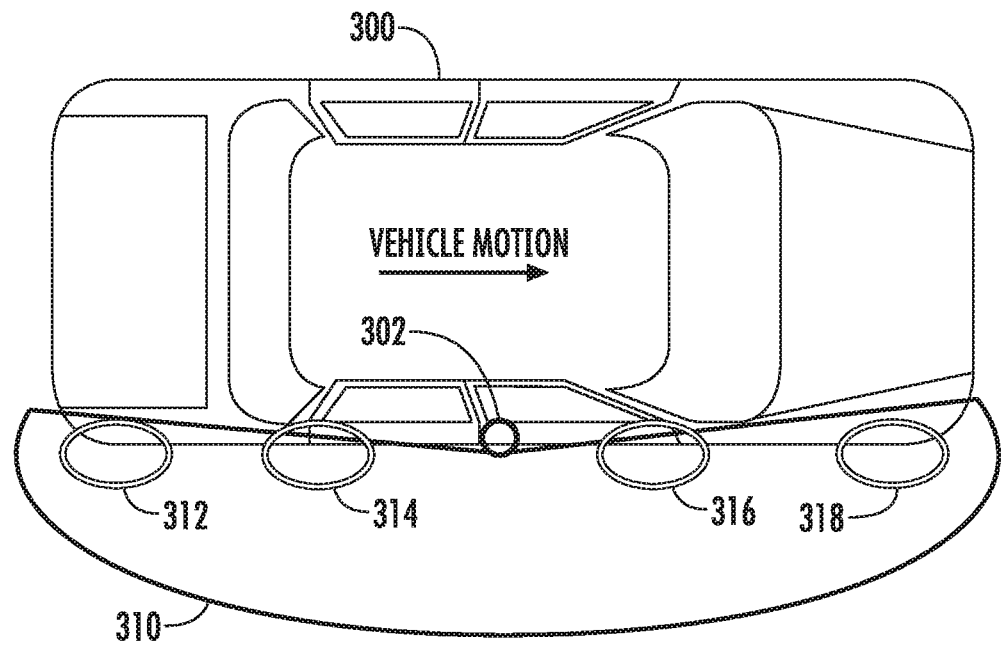
FIGS. 3A and 3B depict an example of fixed feature monitoring for misalignment according to example embodiments of the present disclosure.
Figure 3B:
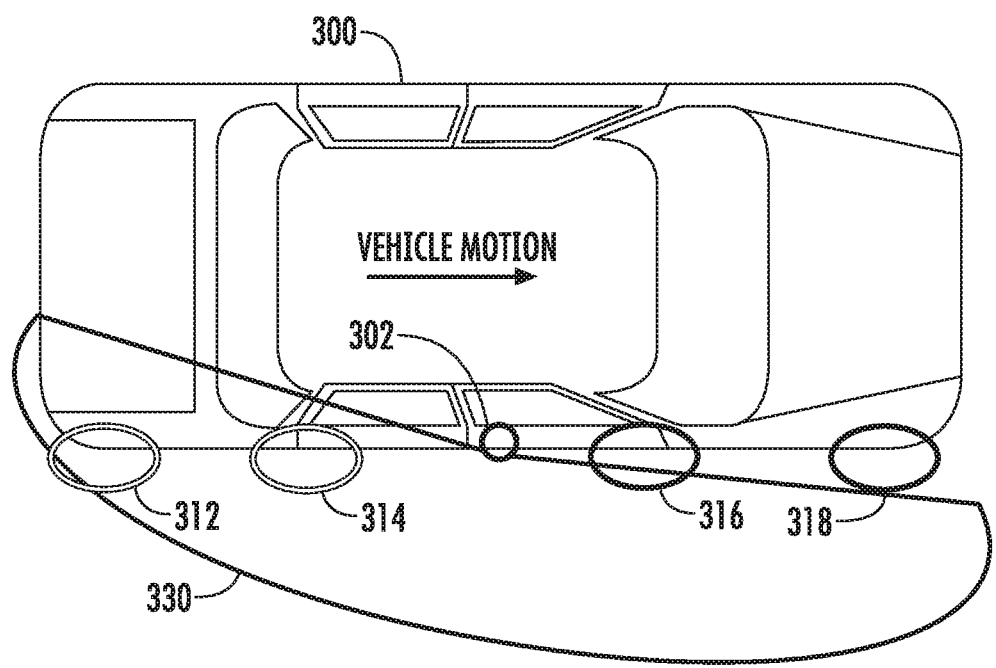
Figure 4A:
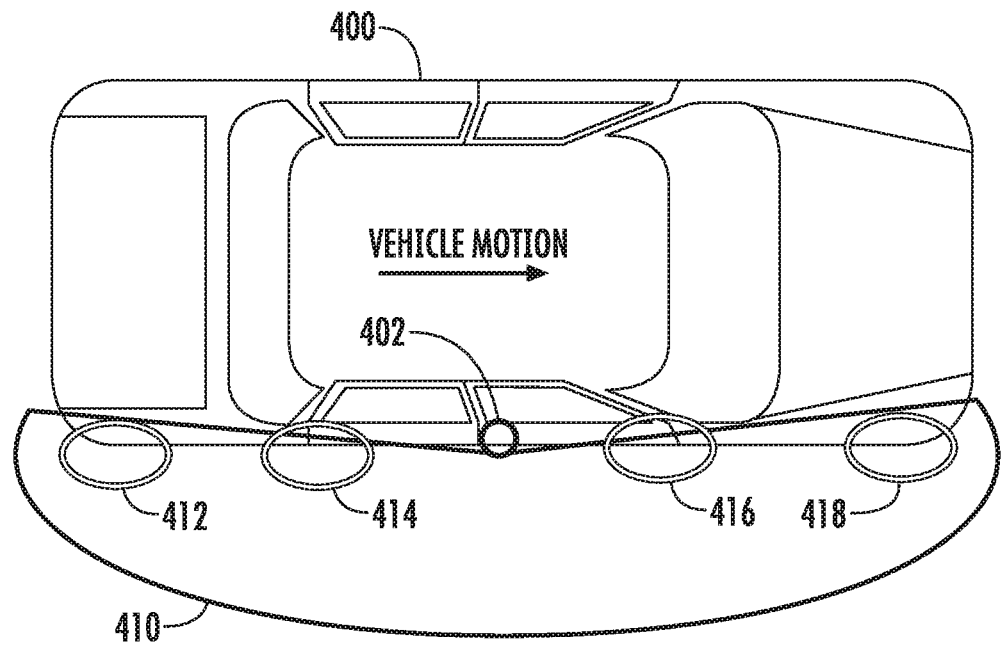
FIGS. 4A and 4B depict an example of fixed feature monitoring for contamination according to example embodiments of the present disclosure.
Figure 4B:
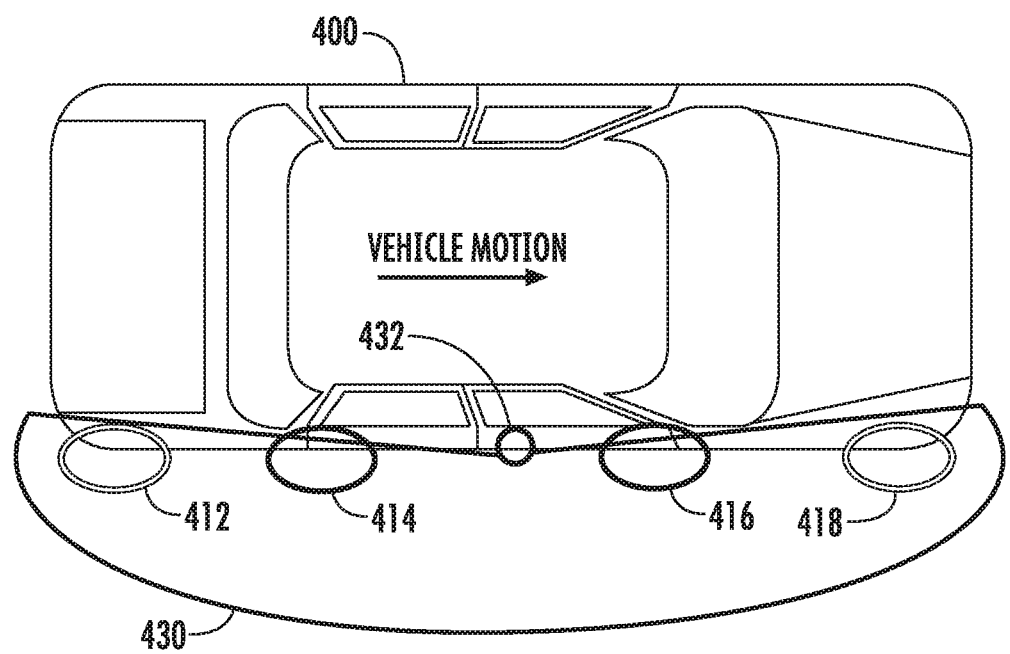
Figure 5A:
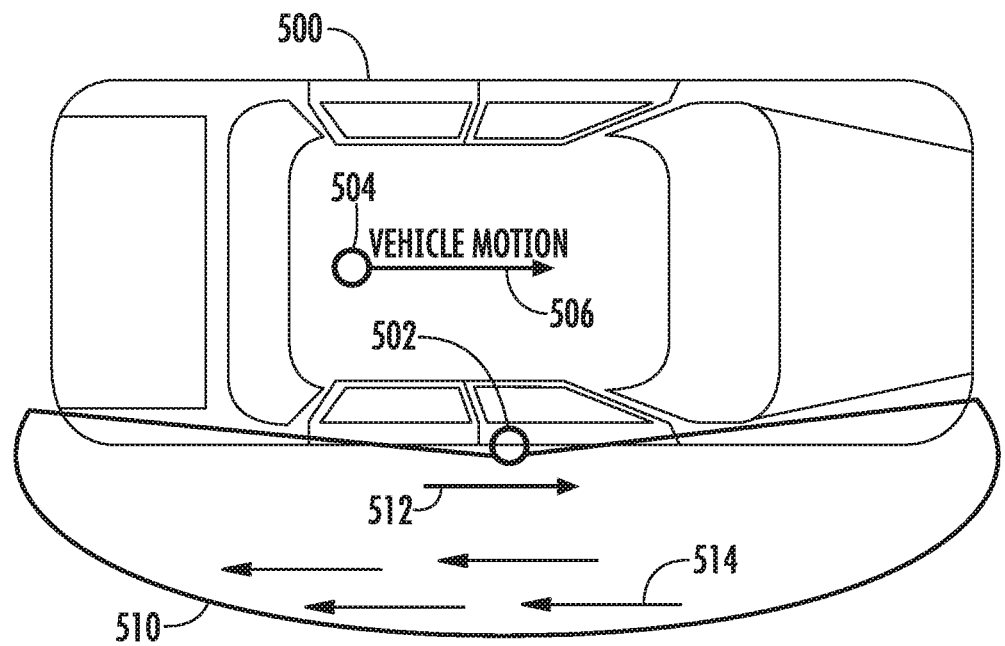
FIGS. 5A and 5B depict an example of motion parameter monitoring for misalignment according to example embodiments of the present disclosure.
Figure 5B:
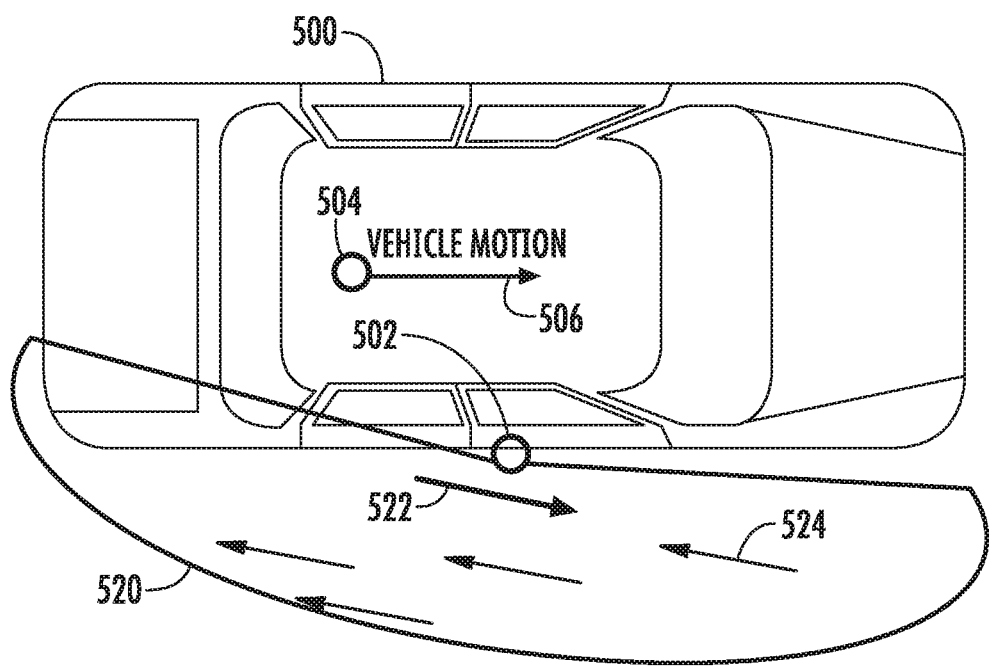

Referring now to FIGS. 3A-3B, 4A-4B, and 5A-5B, such figures depict example aspects of situations in which a comparison of first sensor data and second sensor data indicate a that a change in one or more monitored parameters has exceeded a predetermined threshold value. FIGS. 3A-3B and 4A-4B depict examples in which first data and second data are descriptive of one or more monitored parameters corresponding to a location of one or more reference objects. FIGS. 5A-5B depict examples in which first data and second data are descriptive of one or more monitored parameters corresponding to a vehicle motion parameter.

More particularly, FIGS. 3A and 3B collectively depict an example of determining location of one or more reference objects to identify potential sensor misalignment. FIG. 3A depicts an autonomous vehicle 300 having a first sensor 302 from which first data can be accessed. In some implementations, autonomous vehicle 300 can correspond to autonomous vehicle 10 of FIG. 1. The first data is descriptive of one or more monitored parameters, namely the location of one or more reference objects of the autonomous vehicle 300 that are within a first field of view 310 of the first sensor 302. More particularly, first data obtained from first sensor 302 can be descriptive of a location of a first reference object 312, a second reference object 314, a third reference object 316, and a fourth reference object 318. In the example of FIGS. 3A and 3B, reference objects 312-318 correspond to fixed features, namely, static parts of the physical structure of the autonomous vehicle 300. More particularly, first reference object 312 corresponds to a rear bumper corner of autonomous vehicle 300. Second reference object 314 corresponds to a door edge of autonomous vehicle 300. Third reference object 316 corresponds to a side-view mirror of autonomous vehicle 300. Fourth reference object 318 corresponds to a front bumper corner of autonomous vehicle 300. The reference objects 312-318 are chosen as objects that are within a properly aligned first field of view 310 of first sensor 302.

FIG. 3B depicts the same autonomous vehicle 300 as in FIG. 3A including the same reference objects 312-318. FIG. 3B also depicts a second sensor 332 from which second data can be accessed. The second data is descriptive of one or more monitored parameters, namely the location of reference objects 312-318 of the autonomous vehicle 300 that are within a second field of view 330 of the second sensor 332. More particularly, second data obtained from second sensor 332 can be descriptive of a location of the first reference object 312, second reference object 314, third reference object 316, and fourth reference object 318. Second sensor 332 can correspond to the same sensor as first sensor 302, but characterized by a different alignment. Because of the misalignment of second sensor 332, second field of view 330 is shifted relative to first field of view 310. As such, a change can be determined based on first data captured by a sensor scenario as depicted in FIG. 3A and second data captured by a sensor scenario as depicted in FIG. 3B. When comparing first data captured by first sensor 302 within first field of view 310 to second data captured by second sensor 332 within second field of view 330, not only is a change in location determined for reference objects 312 and 314, but reference objects 316 and 318 appear to be missing because of the substantial shift in alignment of the second sensor 332.

A comparison of data descriptive of the scenarios depicted in FIGS. 3A and 3B can result in determination that the location of one or more reference objects has changed by greater than some predetermined threshold amount. More particularly, one or more of the reference objects 312-318 is characterized by a change between a first location (e.g., an initial location) depicted in FIG. 3A and a second location (e.g., a current location or subsequent location) depicted in FIG. 3B. In response to determining this change in the location of one or more of the reference objects 312-318, a sensor control system (e.g., sensor control system 150 of FIGS. 1-2) can initiate the implementation of a control action relative to sensor 302/332. For example, a sensor control system can adjust alignment of sensor 302/332, determine a compensation factor for the data received from the sensor 302/332, and/or communicate a signal request for service of sensor 302/332.

FIGS. 4A and 4B collectively depict an example of determining location of one or more reference objects to identify potential sensor contamination. FIG. 4A depicts an autonomous vehicle 400 having a first sensor 402 from which first data can be accessed. In some implementations, autonomous vehicle 400 can correspond to autonomous vehicle 10 of FIG. 1. The first data is descriptive of one or more monitored parameters, namely the location of one or more reference objects of the autonomous vehicle 400 that are within a first field of view 410 of the first sensor 402. More particularly, first data obtained from first sensor 402 can be descriptive of a location of a first reference object 412, a second reference object 414, a third reference object 416, and a fourth reference object 418. In the example of FIGS. 4A and 4B, reference objects 412-418 correspond to fixed features, namely, static parts of the physical structure of the autonomous vehicle 400. More particularly, first reference object 412 corresponds to a rear bumper corner of autonomous vehicle 400. Second reference object 414 corresponds to a door edge of autonomous vehicle 400. Third reference object 416 corresponds to a side-view mirror of autonomous vehicle 400. Fourth reference object 418 corresponds to a front bumper corner of autonomous vehicle 400. The reference objects 412-418 are chosen as objects that are within a properly aligned first field of view 410 of first sensor 402.

FIG. 4B depicts the same autonomous vehicle 400 as in FIG. 4A, including the same reference objects 412-418, and second sensor 432 from which second data can be accessed. The second data is descriptive of one or more monitored parameters, namely the location of reference objects 412-418 of the autonomous vehicle 400 that are within a second field of view 430 of the second sensor 432. More particularly, second data obtained from second sensor 432 can be descriptive of a location of the first reference object 412, second reference object 414, third reference object 416, and fourth reference object 418. Second sensor 432 can correspond to the same sensor as first sensor 402, but providing second data at a second time that is different than a first time at which first data is obtained from first sensor 402. At some point between the first time at which first data is obtained from first sensor 402 and the second time at which second data is obtained from second sensor 432, a surface of sensor 402/432 is contaminated such that reference objects 414 and 416 appear to be missing. A location of some reference objects (e.g., reference objects 412 and 418) may be substantially the same between the scenarios depicted in FIGS. 4A and 4B, but the location of other reference objects (e.g., reference objects 414 and 416) may be substantially changed (e.g., from being within first field of view 410 to not appearing at all within second field of view 430).

A comparison of data descriptive of the scenarios depicted in FIGS. 4A and 4B can result in determination that the location of one or more reference objects has changed by greater than some predetermined threshold amount, while the location of one or more reference objects remains the same. More particularly, one or more of the reference objects 412-418 (namely, reference objects 414 and 416) is characterized by a change between a first location (e.g., an initial location) depicted in FIG. 4A and a second location (e.g., a current location or subsequent location) depicted in FIG. 4B, while the location of reference objects 412 and 418 stays the same. In response to such determination relative to reference objects 412-418, a sensor control system (e.g., sensor control system 150 of FIGS. 1-2) can initiate the implementation of a control action relative to sensor 402/432. For example, a sensor control system can initiate automated cleaning of sensor 402/432, determine a compensation factor for the data received from the sensor 402/432, and/or communicate a signal request for service of sensor 402/432.

FIGS. 5A and 5B collectively depict an example of determining motion parameters to identify potential sensor contamination or misalignment. FIGS. 5A-5B depict respective views of an autonomous vehicle 500 having a first sensor 502 from which first data can be accessed, and a second sensor 504 from which second data can be accessed. In some implementations, autonomous vehicle 500 can correspond to autonomous vehicle 10 of FIG. 1. The first data obtained from first sensor 502 can correspond to a local motion parameter estimate 512/522 (e.g., local speed estimate) determined by the first sensor 502 during observation of one or more features in the surrounding environment of the autonomous vehicle 500, as observed within first and second respective fields of view 510/520 of first sensor 502. More particularly, first sensor 502 can determine local motion parameter estimate 512/522 based at least in part on the observed motion 514/524 of one or more features in the surrounding environment during motion of autonomous vehicle 500. The local motion parameter estimate 512/522 determined by the first sensor 502 can be compared to an actual vehicle motion parameter 506 (e.g., actual vehicle speed) determined by second sensor 504.

In some implementations, the first sensor 502 that determines the local motion parameter estimate 512/522 is a sensor used by autonomous vehicle 500 to detect and track objects within the surrounding environment on a continuous basis in order to determine an appropriate motion plan for the autonomous vehicle (e.g., a camera, LIDAR system, RADAR system, SONAR system, etc.). The second sensor 504 can be, for example, a different sensor than the first sensor. For example, the second sensor 504 can include a LIDAR system, a RADAR system, a SONAR system, an imaging system (e.g., a camera), a motion sensor (e.g., an inertial measurement unit (IMU), a speedometer, an accelerometer) and/or a position sensor (e.g., a GPS system, a Galileo positioning system, the GLObal NAvigation Satellite System (GLONASS), the BeiDou Satellite Navigation and Positioning system).

Referring to FIG. 5A, when the local motion parameter estimate 512 determined from first sensor 502 and the actual vehicle motion parameter 506 determined from second sensor 504 are substantially the same (e.g., if a difference between the actual vehicle motion parameter 506 and the local motion parameter estimate 512 is approximately equal to zero), then the first sensor 502 obtaining the local motion parameter estimate 512 can be considered to be properly aligned and/or uncontaminated. However, referring to FIG. 5B, when the local motion parameter estimate 522 determined from first sensor 502 and the actual vehicle motion parameter 506 determined from second sensor 504 are different (e.g., if a difference between the actual vehicle motion parameter 506 and the local motion parameter estimate 522 is greater than a predetermined threshold value), then the difference can be indicative of misalignment and/or contamination of first sensor 502. In the example depicted in FIG. 5B, such difference is indicative of misalignment as represented by second field of view 520 associated with first sensor 502 in FIG. 5B being shifted from first field of view 510 in FIG. 5A. In response, a sensor control system (e.g., sensor control system 150 of FIGS. 1-2) could then implement a control action relative to first sensor 502, such as but not limited to adjusting alignment of first sensor 502, initiating automated cleaning of first sensor 502, determining a compensation factor for the data received from the first sensor 502, and/or communicating a signal request for service of first sensor 502.

Figure 6:
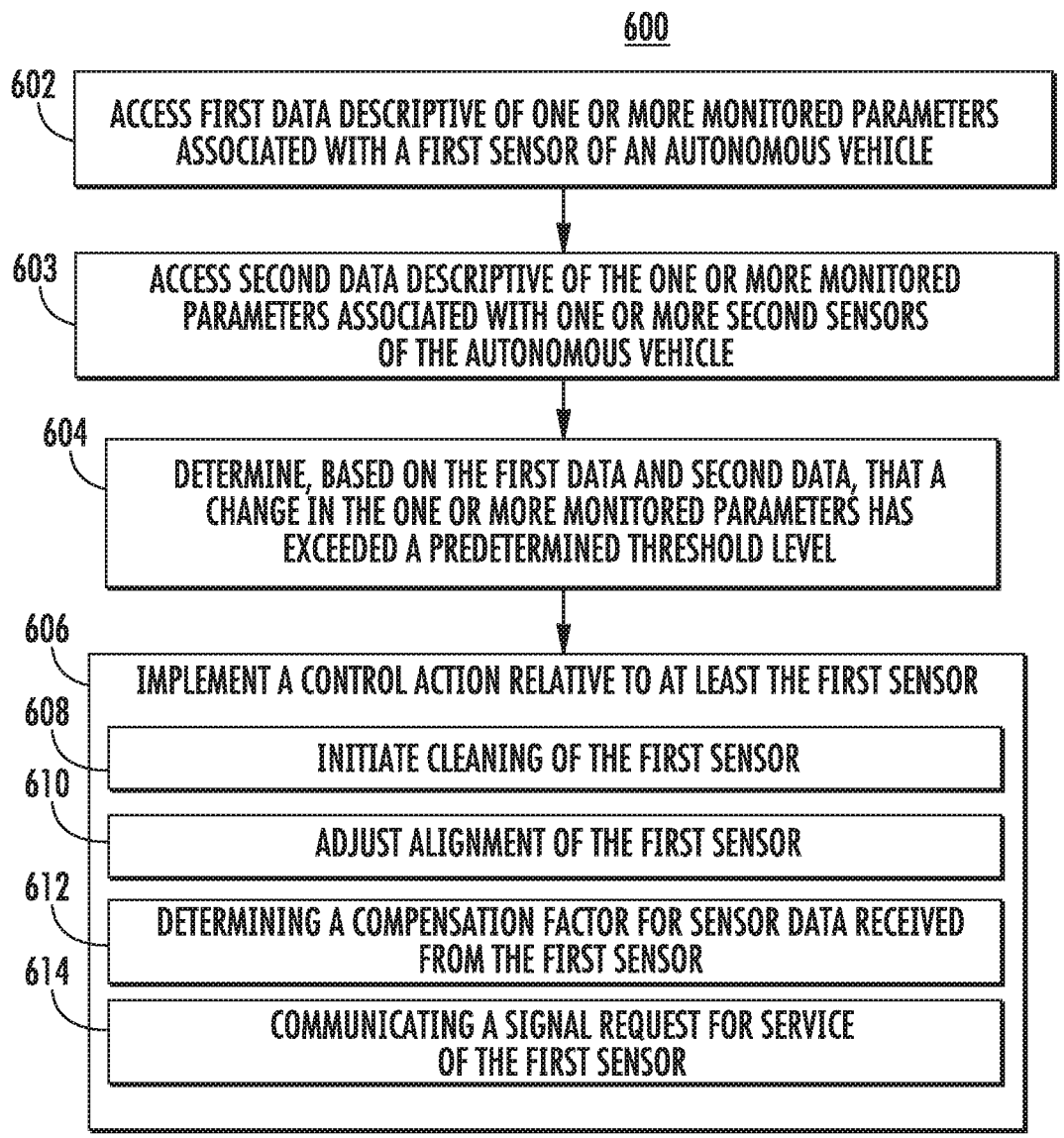
FIG. 6 depicts a flow chart diagram of an example method to control a sensor system according to example embodiments of the present disclosure.

FIG. 6 provides a flowchart diagram of a method 600 to control a sensor system of an autonomous vehicle according to example aspects of the present disclosure. One or more portion(s) of the method 600 can be implemented by one or more computing systems or devices such as, for example, vehicle computing system 102 of FIG. 1.

At 602, one or more computing devices within a computing system can access first data descriptive of one or more monitored parameters associated with a first sensor of an autonomous vehicle. At 603, one or more computing devices within a computing system can access second data descriptive of the one or more monitored parameters associated with one or more second sensors of the autonomous vehicle. At 604, one or more computing devices within a computing system can determine based on the first data accessed at 602 and the second data accessed at 603, that a change in the one or more monitored parameters between the first sensor and the one or more second sensors has exceeded a predetermined threshold level.

More particularly, in some implementations, the one or more monitored parameters within the first data accessed at 602 can include one or more locations of one or more reference objects of the autonomous vehicle within a field of view of the first sensor. The one or more monitored parameters within the second data accessed at 603 can include one or more locations of one or more reference objects of the autonomous vehicle within a field of view of the one or more second sensors.

The one or more reference objects whose location is described within the first data accessed at 602 and/or second data accessed at 603 can include a variety of objects. For example, the reference object(s) can include one or more fixed features within the field of view of the first sensor and one or more second sensors. For example, one or more fixed features can include part of the physical structure of the autonomous vehicle. For example, the one or more fixed features can include one or more side-view mirrors of the autonomous vehicle, one or more door handles of the autonomous vehicle, one or more wheels of the autonomous vehicle, one or more bumper corners of the autonomous vehicle, one or more roof corners of the autonomous vehicle, one or more visual targets painted on or otherwise positioned relative to the autonomous vehicle, and/or other suitable features. The one or more reference objects can additionally or alternatively include one or more predetermined static objects proximate to an autonomous vehicle, for example, objects having a location known to the autonomous vehicle based on map data. Such static objects can include roads, curbs, buildings, lampposts, crosswalks, curbing, traffic lights, traffic control devices, signs, or other suitable objects.

In some implementations, the first sensor and at least one of the one or more second sensors are the same. In other words, the one or more second sensors can include the first sensor. For example, the first sensor and at least one of the second sensors includes a given camera. In such example, the first data accessed at 602 and the second data accessed at 603 can include sensor data obtained from the given camera at first and second different times. A first location (e.g., an initial location or reference location) for each of the one or more reference objects can be determined from the first data accessed at 602, which can include information that describes the location of one or more reference objects within the surrounding environment of the autonomous vehicle, for example, by determining the relative location of each reference object within a portion of the first data at a first time (e.g., an initial time). A second location (e.g., a subsequent location such as a current location) can be determined for each of the one or more reference objects from the second data accessed at 603, which can include information that describes the relative location of each reference object within a portion of the second data at a second time (e.g., a time subsequent to the first initial time). The first data accessed at 602 describing the first location of the one or more reference objects as determined by the first sensor at a first time can be compared to the second data accessed at 603 describing the second location of the one or more reference objects as determined by the one or more second sensors.

In some implementations, the first sensor and the one or more second sensors are different sensors. For example, the first sensor can comprise a first camera while the one or more second sensors comprise a second camera that is different than the first camera, each camera being configured to have at least one of the same reference objects within its corresponding field of view. In such example, the first data accessed at 602 and the second data accessed at 603 can include sensor data obtained from different cameras at the same time or at different times. A first location for each of the one or more reference objects can be determined from the first data accessed at 602, which can include information that describes the location of one or more reference objects within the surrounding environment of the autonomous vehicle, for example, by determining the relative location of each reference object within a portion of the first data. A second location can be determined for each of the one or more reference objects from the second data accessed at 603, which can include information that describes the relative location of each reference object within a portion of the second data. The first data accessed at 602 describing the first location of the one or more reference objects as determined by the first sensor can be compared to the second data accessed at 603 describing the second location of the one or more reference objects as determined by the one or more second sensors.

When the first data accessed at 602 and the second data accessed at 603 indicates that the first location and second location associated with the one or more reference objects is substantially the same or characterized by a change that is less than some predetermined threshold value, then sensor operation can be determined to be properly functioning and no control actions are necessary at such time. However, when a change in the location of the one or more reference objects has been determined at 604 to exceed a predetermined threshold level (e.g., the second location (e.g., current location) determined from the second data is greater than a predetermined threshold distance from the first location (e.g., initial location) determined from the first data), then such change can be indicative of misalignment of the first sensor. This could happen, for example, if the first sensor is mounted on a side-view mirror which is inadvertently shifted to a different position. To ensure proper operation of the sensors, the computing system of the sensor control system could then implement a control action at 606 such as automatically adjusting alignment of the first sensor at 610 (e.g., adjusting the mirror position and/or first sensor position such that the first sensor can obtain sensor data in which the reference objects have returned to their initial location).

In other implementations, a change in the current location of the one or more reference objects can correspond to one or more of the reference objects appearing to be missing from the sensor data. More particularly, first data accessed at 602 that is obtained from a first sensor at a first time can identify an initial location of a given reference object within such first data, while second data accessed at 603 obtained from one or more second sensors (e.g., that include the first sensor) at a second time subsequent to the first time can identify that the given reference object is now missing. Such change could be indicative of contamination of the first sensor. This could happen, for example, if a splash from a mud puddle can have obscured a camera lens, thereby causing a reference object to disappear from the first data collected by the first sensor (e.g., the corresponding camera). To ensure proper operation of this camera, the computing system of the sensor control system could then implement a control action at 606 such as initiating cleaning of the first sensor at 608 (e.g., automated sensor cleaning for a camera).

Referring still to FIG. 6, in some implementations, the one or more monitored parameters associated with first data accessed at 602 and second data accessed at 603 can include a vehicle motion parameter estimate determined by each of the first sensor and the one or more second sensors during operation of the autonomous vehicle. The one or more vehicle motion parameters associated with the autonomous vehicle can include a current vehicle location (also referred to as position); current vehicle speed (also referred to as velocity); current vehicle acceleration; current vehicle heading; current vehicle orientation, or other suitable parameter. For instance, the first data accessed at 602 can be descriptive of a local motion parameter estimate (e.g., local speed estimate) determined by the first sensor during observation of one or more features in the surrounding environment of the autonomous vehicle. The local motion parameter estimate determined by the first sensor can be compared to an actual vehicle motion parameter (e.g., actual vehicle speed) determined by one or more second sensors and described by the second data accessed at 603.

In some implementations, the first sensor that determines the local motion parameter estimate is a sensor used by an autonomous vehicle to detect and track objects within the surrounding environment on a continuous basis in order to determine an appropriate motion plan for the autonomous vehicle. For example, the first sensor can be a LIDAR system, a RADAR system, a SONAR system, an imaging system (e.g., a camera) or the like. The one or more second sensors that determine the actual motion parameter estimate can be a different sensor than the first sensor. For example, the one or more second sensors can include a LIDAR system, a RADAR system, a SONAR system, an imaging system (e.g., a camera), a motion sensor (e.g., an inertial measurement unit (IMU), a speedometer, an accelerometer) and/or a position sensor (e.g. a GPS system, a Galileo positioning system, the GLObal NAvigation Satellite System (GLONASS), the BeiDou Satellite Navigation and Positioning system).

If the local motion parameter estimate determined from the first data accessed at 602 and the actual vehicle motion parameter determined from the second data accessed at 603 are substantially the same (e.g., if a difference between the actual vehicle motion parameter and the local motion parameter estimate is approximately equal to zero), then the first sensor obtaining the local motion parameter estimate can be considered to be properly aligned. If a difference between the actual vehicle motion parameter and the local motion parameter estimate is determined at 604 to be greater than a predetermined threshold value, then such difference can be indicative of misalignment of the first sensor. In response, the computing system of the sensor control system could then implement a control action at 606 such as automatically adjusting alignment of the first sensor at 610.

In still further implementations, the one or more monitored parameters within the first data accessed at 602 and the second data accessed at 603 can include a quality level associated with the first sensor and one or more second sensors (e.g., a camera, a LIDAR sensor, a RADAR sensor, etc.). For example, the quality level can correspond to a contamination level of a sensor surface of the first sensor. When the first sensor comprises a camera, the one or more monitored parameters within the first data accessed at 602 can include a sharpness or a brightness of at least a portion of a frame included in imagery captured by the camera.

In some implementations, the first sensor having a quality level described by the first data accessed at 602 and at least one of the one or more second sensors having a quality level described by the second data accessed at 603 are the same. In other words, the one or more second sensors can include the first sensor. For example, the first sensor and at least one of the second sensors includes a given camera. In such example, the first data accessed at 602 and the second data accessed at 603 can include a quality level (e.g., a contamination level of a sensor surface) associated with the given camera at first and second different times. A first quality level obtained at a first time (e.g., an initial time) can be determined from the first data accessed at 602, while a second quality level obtained at a second time (e.g., a subsequent time or a current time) can be determined from the second data accessed at 603. The first data accessed at 602 describing the first quality level as determined by the first sensor at a first time can be compared to the second data accessed at 603 describing the second quality level as determined by the one or more second sensors.

In some implementations, the first sensor having a quality level described by the first data accessed at 602 and at least one of the one or more second sensors having a quality level described by the second data accessed at 603 are different sensors. For example, the first sensor can comprise a first camera while the one or more second sensors comprise a second camera that is different than the first camera. In such example, the first data accessed at 602 and the second data accessed at 603 can include sensor data obtained from different cameras at the same time or at different times. A first quality level can be determined from the first data accessed at 602, while a second quality level can be determined from the second data accessed at 603. The first data accessed at 602 describing the first quality level of the first sensor can be compared to the second data accessed at 603 describing the second quality level of the second sensor.

When a change in the quality level described by the first data accessed at 602 and the second data accessed at 603 is determined at 604 to exceed a predetermined threshold level, a sensor control system can implement a control action relative to at least the first sensor at 606. For example, imagery can be analyzed for image sharpness and/or brightness based on pixel to pixel contrast across at least a portion of a frame included in the imagery captured by the camera(s). Changes in sensor quality level, for example, at one or more pixels over time or at one or more pixels of different cameras can be indicative of contamination of the one or more sensors. This could happen, for example, if a splash from a mud puddle can have obscured a camera lens, thereby causing the image quality to change at one or more pixels within imagery obtained by the corresponding camera. To ensure proper operation of this camera, the computing system of the sensor control system could then implement a control action at 606 such as initiating automated sensor cleaning for the camera at 608.

Referring still to FIG. 6, control actions implemented at 606 can vary depending on whether the change in monitored parameter(s) determined at 604 indicates potential misalignment, contamination, or other occurrence.

In some implementations, implementing a control action at 606 includes initiating cleaning of the first sensor at 608. For instance, a computing system associated with a sensor control system can initiate cleaning of one or more sensors at 608 when a change in the monitored parameter(s) associated with the one or more sensors as determined at 604 is indicative of potential contamination.

In some implementations, implementing a control action at 606 includes adjusting alignment of the first sensor at 610. For example, a computing system associated with a sensor control system can automatically adjust alignment of the one or more sensors at 610 when a change in the monitored parameter(s) associated with the one or more sensors as determined at 604 is indicative of potential misalignment.

In some implementations, implementing a control action at 606 includes determining a compensation factor for sensor data received from the first sensor at 612. For example, a computing system associated with a sensor control system can determine at 612 a compensation factor for sensor data received from the one or more sensors (e.g., an adjusted location of objects detected within sensor data, an adjusted motion parameter derived from sensor data, etc.) The compensation factor determined at 612 can be based at least in part on a level of the change in the one or more monitored parameters determined at 604.

In some implementations, implementing a control action at 606 includes communicating a signal request for service of the first sensor at 614. For example, a computing system associated with a sensor control system can communicate at 614 a signal request for service of one or more sensors (e.g., the first sensor) when a change in the monitored parameter(s) associated with the one or more sensors (e.g., the first sensor) as determined at 604 is indicative of contamination, misalignment, or other concern that is either unable to be remedied or is unsuccessfully remedied via automated cleaning, realignment, or the like.

Figure 7:
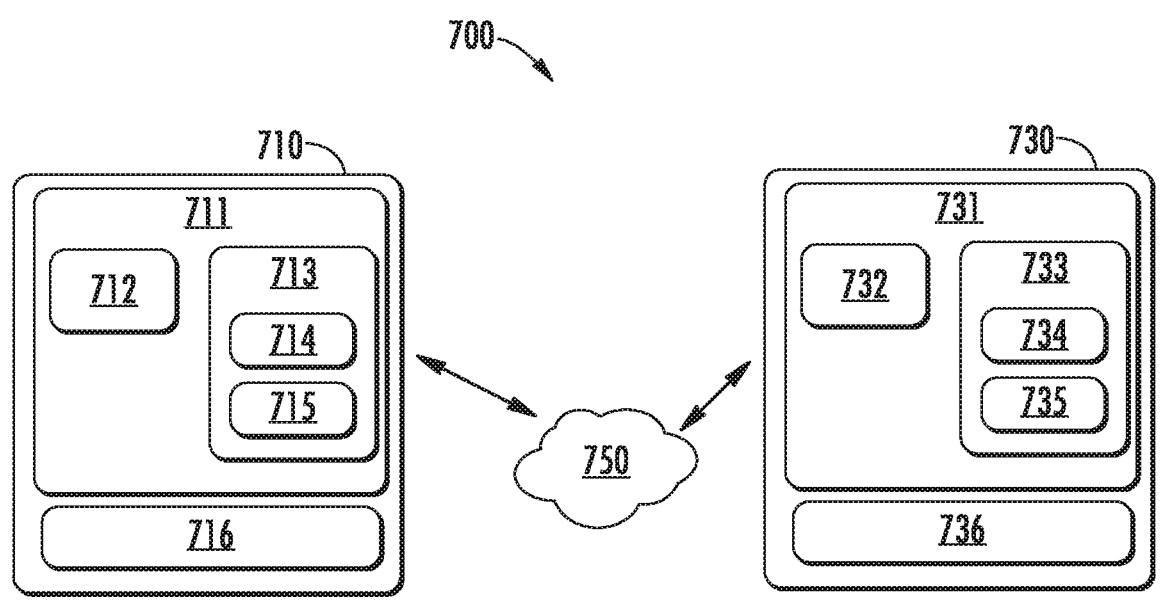
FIG. 7 provides a block diagram of example system components according to example embodiments of the present disclosure.

FIG. 7 provides a block diagram of example system components according to example embodiments of the present disclosure. More particularly, FIG. 7 provides a block diagram of an example computing system 700 according to example embodiments of the present disclosure. Computing system 700 can include a vehicle computing system 710 associated with an autonomous vehicle and a remote computing system 730. The vehicle computing system 710 and remote computing system 730 can be communicatively coupled over a network 750.

The vehicle computing system 710 associated with an autonomous vehicle can correspond in some examples to vehicle computing system 102 associated with autonomous vehicle 10 as described with reference to FIG. 1. Vehicle computing system 710 can include one or more distinct physical computing devices 711 that respectively include one or more processors 712 and at least one memory 713. The one or more processors 712 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 713 can include one or more non-transitory computer-readable storage mediums, such as RAM, ROM, EEPROM, EPROM, flash memory devices, magnetic disks, etc., and combinations thereof. The memory 713 can store data 714 and instructions 715 which are executed by the processor 712 to cause vehicle computing system 710 to perform operations. The instructions 715 can be software written in any suitable programming language or can be implemented in hardware. Additionally, or alternatively, the instructions 715 can be executed in logically and/or virtually separate threads on processor(s) 712. For example, the memory 713 can store instructions 715 that when executed by the one or more processors 712 cause the one or more processors 712 to perform any of the operations and/or functions described herein, including, for example, operations 602-614 of FIG. 6. Vehicle computing system 710 can also include a network interface 716 used to communicate with one or more systems or devices, including systems or devices that are remotely located from the vehicle computing system 710. The network interface 716 can include any circuits, components, software, etc. for communicating with one or more networks (e.g., network 750). In some implementations, the network interface 716 can include, for example, one or more of a communications controller, receiver, transceiver, transmitter, port, conductors, software, and/or hardware for communicating data.

The remote computing system 730 can correspond to an operations computing system associated with an entity (e.g., a service provider) that provides one or more vehicle service (s) to a plurality of users via a fleet of vehicles that includes, for example, the autonomous vehicle 10 of FIG. 1. The vehicle service(s) can include transportation services (e.g., rideshare services), courier services, delivery services, and/ or other types of services. The vehicle service(s) can transport and/or deliver passengers as well as items such as but not limited to food, animals, freight, purchased goods, etc. Remote computing system 730 can include one or more distinct physical computing devices 731 that respectively include one or more processors 732 and at least one memory 733. The one or more processors 732 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 733 can include one or more non-transitory computer-readable storage mediums, such as RAM, ROM, EEPROM, EPROM, flash memory devices, magnetic disks, etc., and combinations thereof. The memory 733 can store data 734 and instructions 735 which are executed by the processor 732 to cause operations computing system 730 to perform operations. The instructions 735 can be software written in any suitable programming language or can be implemented in hardware. Additionally, or alternatively, the instructions 735 can be executed in logically and/or virtually separate threads on processor(s) 732. For example, the memory 733 can store instructions 735 that when executed by the one or more processors 732 cause the one or more processors 732 to perform any of the operations and/or functions described herein, for example, one or more of operations 602-614 of FIG. 6. Operations computing system 730 can also include a network interface 736 used to communicate with one or more systems or devices, including systems or devices that are remotely located from the remote computing system 730. The network interface 736 can include any circuits, components, software, etc. for communicating with one or more networks (e.g., network 750). In some implementations, the network interface 736 can include, for example, one or more of a communications controller, receiver, transceiver, transmitter, port, conductors, software, and/or hardware for communicating data.

The network(s) 750 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 850 can be accomplished, for instance, via a network interface using any type of protocol, protection scheme, encoding, format, packaging, etc.

FIG. 7 illustrates one example system 700 that can be used to implement the present disclosure. Other computing systems can be used as well. In addition, components illustrated and/or discussed as being included in one of the computing systems 710 and/or 730 can instead be included in another of the computing systems 710 and/or 730. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A sensor control system for an autonomous vehicle, comprising:
a computing system comprising one or more processors and one or more non-transitory computer-readable media that collectively store instructions that, when executed by the one or more processors, cause the computing system to perform operations, the operations comprising:
accessing first data descriptive of one or more monitored parameters associated with a first sensor of an autonomous vehicle, wherein the first sensor is located on the autonomous vehicle;
accessing second data descriptive of the one or more monitored parameters associated with one or more second sensors of the autonomous vehicle;
wherein the one or more monitored parameters associated with the first sensor and the one or more second sensors comprises a contamination level associated with each of the first sensor and the one or more second sensors;
wherein the first sensor and the one or more second sensors are different types of sensors, and wherein the different types of sensors consist of one or more cameras, one or more Light Detection and Ranging (LIDAR) system sensors, one or more Radio Detection and Ranging (RADAR) system sensors, one or more sonar systems, a motion sensor, or a position sensor;
determining, based on a comparison of the first data to the second data, that a change in the one or more monitored parameters between the first sensor and the one or more second sensors has exceeded a predetermined threshold level; and
in response to determining that the change in the one or more monitored parameters between the first sensor and the one or more second sensors has exceeded the predetermined threshold level, implementing a control action on the first sensor.

2. The sensor control system of claim 1, wherein the one or more monitored parameters comprises one or more locations of one or more reference objects of the autonomous vehicle within a field of view of the first sensor and the one or more second sensors.

3. The sensor control system of claim 2, wherein determining that the change in the one or more monitored parameters between the first sensor and the one or more second sensors has exceeded the predetermined threshold level comprises determining that a change in a relative location of each reference object over time has exceeded a predetermined threshold distance.

4. The sensor control system of claim 1, wherein the one or more monitored parameters associated with the first sensor and the one or more second sensors comprise a vehicle motion parameter estimate determined by each of the first sensor and the one or more second sensors during an observation of one or more features in a surrounding environment of the autonomous vehicle.

5. The sensor control system of claim 1, wherein the first sensor comprises a camera and the one or more monitored parameters comprise a sharpness or a brightness of at least a portion of a frame included in imagery captured by the camera.

6. The sensor control system of claim 1, wherein the control action comprises initiating cleaning of the first sensor.

7. An autonomous vehicle, comprising:
a sensor system comprising a first sensor and one or more second sensors configured to obtain respective first sensor data and second sensor data descriptive of one or more monitored parameters associated with an autonomous vehicle, wherein the one or more monitored parameters comprises a quality level associated with each of the first sensor and the one or more second sensors, wherein the quality level comprises a contamination level of at least the first sensor, wherein the first sensor data is descriptive of one or more monitored parameters associated with the contamination level of the first sensor located on the autonomous vehicle, wherein the second sensor data is descriptive of the one or more monitored parameters associated with a contamination level of one or more second sensors located on the autonomous vehicle, wherein the one or more second sensors and the first sensor are different types of sensors, and wherein the different types of sensors consist of one or more cameras, one or more LIDAR system sensors, one or more RADAR system sensors, one or more sonar systems, a motion sensor, or a position sensor; and
a sensor control system comprising:
a sensor cleaning system configured to clean at least the first sensor;
a sensor alignment system configured to align at least the first sensor; and
a computing system including one or more computing devices configured to access data descriptive of the first sensor data and the second sensor data, to determine based on a comparison of the first sensor data to the second sensor data that a change in the one or more monitored parameters has occurred, and in response to determining that the change in the one or more monitored parameters has occurred to generate a control action signal to one or more of the sensor cleaning system and the sensor alignment system.

8. The autonomous vehicle of claim 7, the sensor control system further comprising a sensor compensation system configured to determine a compensation factor for the first sensor data received from the first sensor, wherein the compensation factor is based at least in part on a level of the change in the one or more monitored parameters.

9. The autonomous vehicle of claim 7, the sensor control system further comprising a sensor service signaling system configured to communicate a signal request for service of the first sensor.

10. The autonomous vehicle of claim 7, wherein the one or more monitored parameters comprises one or more locations of one or more reference objects of the autonomous vehicle within a field of view of the first sensor and the one or more second sensors.

11. The autonomous vehicle of claim 7, wherein the one or more monitored parameters comprises a vehicle motion parameter estimate determined by each of the first sensor and the one or more second sensors during an observation of one or more features in a surrounding environment of the autonomous vehicle.

12. The autonomous vehicle of claim 7, wherein the one or more monitored parameters comprises a quality level associated with each of the first sensor and the one or more second sensors, wherein the quality level comprises a contamination level of at least the first sensor.

13. A sensor control system for an autonomous vehicle, comprising:
- a computing system comprising one or more processors and one or more non-transitory computer-readable media that collectively store instructions that, when executed by the one or more processors, cause the computing system to perform operations, the operations comprising:
- accessing first data descriptive of one or more monitored parameters associated with a first sensor of an autonomous vehicle, wherein the first sensor is located on the autonomous vehicle;
- accessing second data descriptive of the one or more monitored parameters associated with one or more second sensors of the autonomous vehicle;
- wherein the one or more monitored parameters comprises one or more locations of one or more fixed features that are part of the physical structure of the autonomous vehicle and configured to be in a static position and within a field of view of the first sensor and the one or more second sensors;
- determining, based on a comparison of the first data to the second data, that a change in the one or more monitored parameters between the first sensor and the one or more second sensors has exceeded a predetermined threshold level; and
- in response to determining that the change in the one or more monitored parameters between the first sensor and the one or more second sensors has exceeded the predetermined threshold level, implementing a control action on the first sensor.

14. The sensor control system of claim 13, wherein the control action comprises adjusting alignment of the first sensor.

15. The sensor control system of claim 13, wherein the control action comprises determining a compensation factor for sensor data received from the first sensor, wherein the compensation factor is based at least in part on a level of the change in the one or more monitored parameters.

16. The sensor control system of claim 13, wherein the one or more second sensors comprises the first sensor, and wherein the first data is obtained from the first sensor at a first time and wherein the second data is obtained from the first sensor at a second time that is different than the first time.

* * * * *